(12) United States Patent
Bin Mohd Nordin et al.

(10) Patent No.: US 8,886,513 B2
(45) Date of Patent: *Nov. 11, 2014

(54) EMBEDDED BUS EMULATION

(75) Inventors: Zailani Bin Mohd Nordin, Kedah (MY); Eng Tien Ee, Kedah (MY)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/585,545

(22) Filed: Aug. 14, 2012

(65) Prior Publication Data

US 2012/0316859 A1 Dec. 13, 2012

Related U.S. Application Data

(63) Continuation of application No. 11/861,121, filed on Sep. 25, 2007, now Pat. No. 8,275,599.

(51) Int. Cl.
*G06F 9/455* (2006.01)

(52) U.S. Cl.
USPC .............................. 703/25; 703/23; 370/362

(58) Field of Classification Search
USPC ...................................... 703/23, 25; 370/362
See application file for complete search history.

(56) References Cited

U.S. PATENT DOCUMENTS

| | | | | |
|---|---|---|---|---|
| 5,313,618 A | * | 5/1994 | Pawloski | 703/28 |
| 5,524,245 A | * | 6/1996 | Zarrin et al. | 713/2 |
| 5,596,738 A | * | 1/1997 | Pope | 711/103 |
| 2009/0083022 A1 | | 3/2009 | Bin Mohd Nordin et al. | |

OTHER PUBLICATIONS

Philips Semiconductors, "The I2C-Bus Specification", Version 2.1, Jan. 2000, Doc. Order No. 9398 393 40011, 46 pp.
SBS Implementers Forum, "System Management Bus (SMBus) Specification", Version 2.0, Aug. 3, 3000, 59 pp.
SMBus Intel, 2005, 1 pg.
Wikipedia, "System Management Bus", [online], modified May 3, 2007, [Retrieved on May 9, 2007], retrieved from the Internet at <URL: http://en.wikipedia.org/wiki/System_Management_Bus>, 1 pg.
Wolf, A., "I2C (Inter-Integrated Circuit) Bus Technical Overview and Frequently Asked Questions (FAQ)", [online], 2000, [retrieved on Jul. 12, 2007], retrieved from the Internet at <URL: http://www.esacademy.com/faq/i2c/index.htm>, 1pg.
Advisory Action 1 for U.S. Appl. No. 11/861,121, dated Dec. 1, 2010, 6 pp. [77.205 (AdvAct1)].
Advisory Action 2 for U.S. Appl. No. 11/861,121, dated Mar. 13, 2012, 3 pp. [77.205 (AdvAct2)].
Final Office Action 1 for U.S. Appl. No. 11/861,121, dated Aug. 30, 2010, 11 pp. [77.205 (FOA1)].

(Continued)

*Primary Examiner* — Saif Alhija
(74) *Attorney, Agent, or Firm* — Konrad Raynes Davda & Victor LLP

(57) ABSTRACT

A bus emulation device in accordance with one aspect of the present description includes an embedded microcontroller and a nonvolatile memory carried on a body. The memory contains firmware which includes boot code adapted to boot the microcontroller to operate in one of a plurality of dedicated operating modes in response to a mode switch. These dedicated operating modes include a learning mode in which bus signals generated by other bus devices are recorded in the nonvolatile memory, and an emulation mode in which recorded bus signals are retransmitted over the bus in response to received signals, to emulate a bus device. Other aspects are described and claimed.

15 Claims, 4 Drawing Sheets

(56) References Cited

OTHER PUBLICATIONS

Final Office Action 2 for U.S. Appl. No. 11/861,121, dated Jan. 6, 2012, 11 pp. [77.205 (FOA2)].
Notice of Allowance for U.S. Appl. No. 11/861,121, dated May 11, 2012, 10 pp. [77.205 (NOA1)].
Office Action 1 for U.S. Appl. No. 11/861,121, dated Mar. 19, 2010, 10 pp. [77.205 (OA1)].
Office Action 3 for U.S. Appl. No. 11/861,121, dated Dec. 23, 2010, 10 pp. [77.205 (OA3)].
Office Action 4 for U.S. Appl. No. 11/861,121, dated Jun. 10, 2011, 13 pp. [77.205 (OA4)].
Response to Final Office Action 1 for U.S. Appl. No. 11/861,121, dated Nov. 1, 2010, 9 pp. [77.205 (RFOA1-1)].
Response to Final Office Action 1 for U.S. Appl. No. 11/861,121, dated Nov. 29, 2010, 9 pp. [77.205 (RFOA1-2)].
Response to Final Office Action 2 for U.S. Appl. No. 11/861,121, dated Mar. 6, 2012, 12 pp. [77.205 (RFOA2-1)].
Response to Final Office Action 2 for U.S. Appl. No. 11/861,121, dated Apr. 6, 2012, 11 pp. [77.205 (RFOA2-2)].
Response to Office Action 1 for U.S. Appl. No. 11/861,121, dated Jun. 21, 2010, 9 pp. [77.205 (ROA1)].
Response to Office Action 3 for U.S. Appl. No. 11/861,121, dated Mar. 23, 2011, 10 pp. [77.205 (ROA3)].
Response to Office Action 4 for U.S. Appl. No. 11/861,121, dated Sep. 12, 2011, 11 pp. [77.205 (ROA4)].

* cited by examiner

EMBEDDED BUS EMULATION

CROSS-REFERENCE TO RELATED APPLICATION

This application is a continuation of U.S. patent application Ser. No. 11/861,121, filed Sep. 25, 2007, which application is incorporated herein by reference in its entirety.

BACKGROUND

The System Management Bus (often abbreviated as SMBus or SMB) is a relatively simple two-wire bus used for communication among various devices of a computer system. Examples of such devices which may communicate data over an SMBus include temperature sensors, lid switches and a rechargeable battery subsystem.

In the design and manufacturing of a computer system or other system which may utilize one or more SMBus devices, one approach has been to connect actual SMBus devices to the SMBus of a system being tested to ensure proper operation of the SMBus related functions. However, the actual SMBus devices may not be available for testing with the system being tested for a variety of reasons. Accordingly, another approach as depicted in FIG. 1, has been to connect a general purpose workstation 10 to the SMBus 12 of the system 14 being developed. A general purpose workstation such as the workstation 10 typically includes a monitor 18, keyboard 20, and a central processing unit (CPU) case 16 which usually houses a motherboard on which a microprocessor, the main memory, and other components are typically mounted. Additional components such as external storage, controllers for video display and sound, and peripheral devices are frequently attached to the motherboard via edge connectors and cables. However, it is increasingly common to mount integrated circuits for these and other peripheral devices onto the motherboard. In this example, the workstation 10 typically has an expansion card 30 carrying a suitable bus adapter (such as an I²C (Integrated Circuit Inter) compatible adapter) which permits the workstation 10 to be coupled to the SMBus 12 of the system 14 being tested.

The workstation 10 may be programmed with an application program typically loaded by the general operating system from magnetic or optical storage to enable the workstation 10 to emulate a bus device. The program may have a learning mode by which bus signals generated by other devices on the bus 12 are recorded by the workstation 10. In a subsequent emulation mode, stored bus signals may be retransmitted by the workstation 10 over the bus 12 in response to received signals, thereby emulating an actual bus device.

DETAILED DESCRIPTION OF THE DRAWINGS

Figure 1:
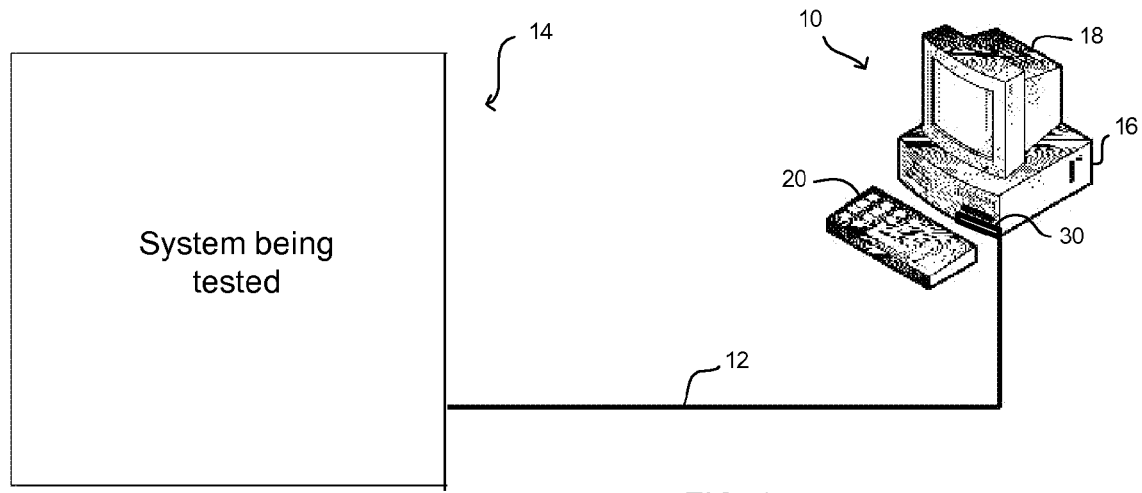
FIG. 1 is a schematic diagram illustrating a prior art general purpose workstation coupled to a bus of a system being tested in which the workstation is programmed to emulate a bus device coupled to the bus.
Figure 2:
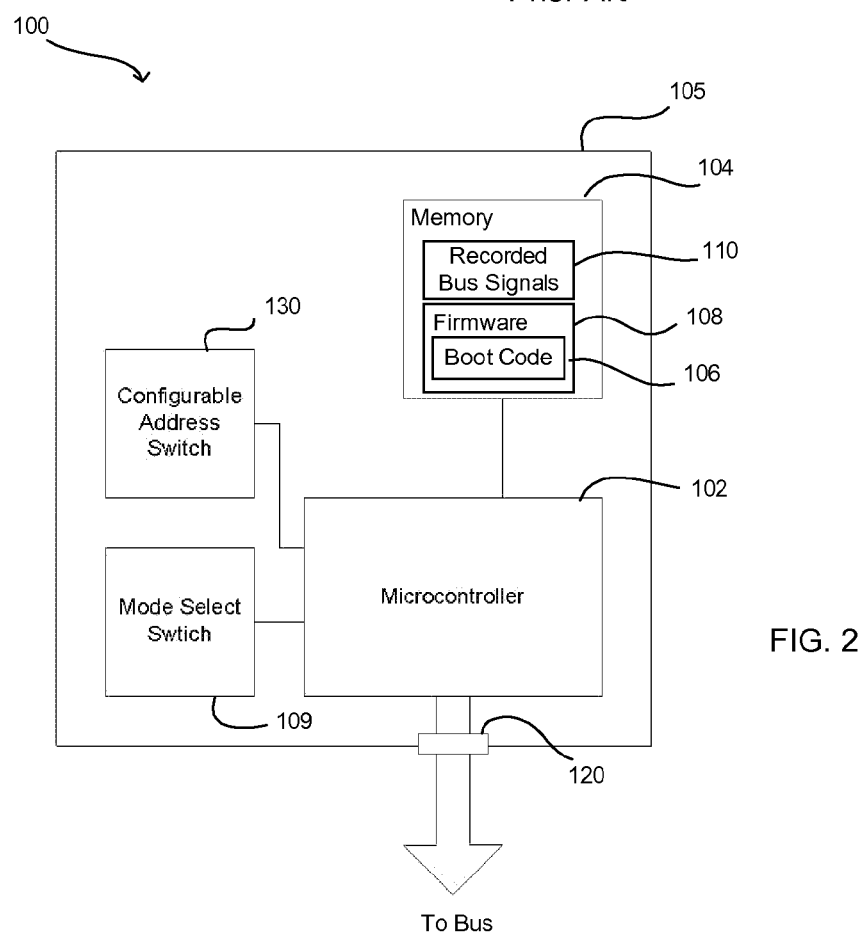
FIG. 2 is a schematic diagram of an embedded bus emulation device in accordance with one embodiment of the present description.

A bus emulation device in accordance with one aspect of the present description is indicated generally at 100 in FIG. 2. The device 100 includes an embedded microcontroller 102 and a nonvolatile memory 104 which are carried on a body 105. The memory 104 contains firmware 108 which includes boot code 106 adapted to boot the microcontroller to operate in one of a plurality of dedicated operating modes in response to a mode switch 109. The boot code defines a boot sequence which is the set of operations the microcontroller performs first when it is switched on (or reset) and to ready the microcontroller to be operated in one of the dedicated operating modes as defined by the operating code portion of the firmware 108. These dedicated operating modes include a learning mode and an emulation mode as discussed below.

The microcontroller 102 includes firmware programmable or dedicated logic circuitry such as, for example, a central processing unit (CPU), application-specific integrated circuit (ASIC) logic circuits, field-programmable gate array (FPGA) logic circuits, or various combinations thereof. The microcontroller 102 and the nonvolatile memory 104 may be disposed on the same integrated circuit or on separate integrated circuit chips.

In accordance with one aspect of the present description, the architecture of the device 100 permits the emulation device 100 to be, depending upon the particular application, compact, readily portable and relatively inexpensive to manufacture. In one embodiment, the body 105 may be a single, small printed circuit board having edge connectors or other terminals to connect the bus emulation device 100 to a bus. In another embodiment, the body 105 may be a single small integrated circuit package having pin connectors or other terminals received by a socket or other connectors to connect the emulation device to a bus. It is appreciated that in other embodiments, the size and type of the body 105 and the number of components making up the body 105 may vary, depending upon the particular application. It is further appreciated that features other than compactness, portability and reduced cost may be achieved in addition to or instead of those discussed herein, depending upon the particular application.

By comparison, a programmed general purpose workstation such as the workstation 10 of the prior art tends to be bulky, not easily transported and relatively expensive to manufacture. Many of these drawbacks apply even to programmed general purpose workstations having a relatively small form factor such as laptop computers. Programmed general purpose workstations typically have a complex motherboard, expansion cards, and a complex operating system. The operating system and application programs run under the operating system, are typically stored in and loaded from magnetic media hard drives and optical media drives which are controlled by controller circuits on the motherboard or various expansion cards. The workstation is typically controlled by a human operator inputting commands through various complex input devices including full QWERTY keyboards, mice and other complex input devices. Operation of the workstation is typically monitored by viewing a monitor or other display attached to the workstation.

In accordance with one aspect of the present description, the bus emulation device 100 can obviate the need for a programmed general purpose workstation to emulate a bus device. Hence, in one embodiment, the complex motherboard, expansion cards, complex operating system, volatile memory, magnetic media drives, optical media drives, monitor, magnetic and optical drive controller circuits, monitor controller circuits, and complex input devices such as full QWERTY keyboards and mice typically found in a programmed general purpose workstation may be eliminated, depending upon the particular application.

As discussed in greater detail below, in the learning mode, the microcontroller 102 is controlled by the firmware 108 to record in a portion 110 of the nonvolatile memory 104, bus query signals received from a bus connected by a bus connector 120 to the bus emulation device 100. As used herein, a "query signal" refers to command signals, data signals or combinations thereof sent over a bus by a master bus device to a target or slave bus device. Further, a "response signal" refers to data signals sent over a bus by a target or slave bus device to a master bus device or other devices on the bus. A response signal is typically sent in response to a particular query signal. However, it is appreciated that some response signals may not be in response to any particular command or other query signal from a master bus device. In one embodiment, the nonvolatile memory 104 may be a flash memory. It is appreciated that other types of nonvolatile memory may be used as well.

Query signals may be addressed to a particular target device or may be "broadcast" to all or some devices of a particular type on the bus. Similarly, response signals may be addressed to a particular master device or may be broadcast to all or some devices on the bus.

A configurable address switch 130 also disposed on the body 105 may be configured to set a bus address of the emulation device 100. In the learning mode, if the microcontroller 102 receives a bus query signal addressed to the bus address set by the configurable address switch 130, or receives a broadcast query signal, the microcontroller 102 is controlled by the firmware 108 to store the received query signal in a portion 110 of the memory 104.

Following receipt of a query signal, the microcontroller 102 may subsequently receive a response signal generated by a target device on the same bus. If the target device has the bus address to which the query signal was addressed, or if the query signal was broadcast to the target device, the target device may generate a suitable response signal in response to the associated query signal in accordance with the bus protocol. In the learning mode, if the microcontroller 102 receives a bus response signal associated with a recorded query signal, the microcontroller 102 is controlled by the firmware 108 to store the received response signal in a portion 110 of the memory 104 and associate it with the prior recorded query signal.

The emulation device 100 may be readily switched from the learning mode to the emulation mode by operating the mode switch 109. In the emulation mode, the microcontroller 102 is controlled by the firmware 108 to transmit through the bus connector 120 to the connected bus, previously recorded response signals in response to receipt of associated query signals addressed to the emulation device 100. In this manner, a target bus device may be emulated by the bus emulation device 100.

In one embodiment, the emulation device 100 may be substantially simplified if the firmware 108 limits the microcontroller to be booted to operate in only dedicated modes of operation rather than general modes. Additional simplification may be achieved by limiting the dedicated modes to one of only two dedicated modes, that is, the learning mode and the emulation mode. As a consequence, the boot code 106 and operating code of the firmware 108 may be substantially simplified. The need for a complex operating system and application programs stored in magnetic or optical storage may be eliminated. In addition, the operation of the emulation device 100 may be controlled by a simple mode select switch 109 which may have as few as two input positions for selecting the operating mode. Thus, the mode select switch 109 may be a binary switch, for example.

The configurable address switch 130 may similarly be a very simple series of switches such as, for example, binary switches for inputting a bus address such as a binary coded bus address. Thus, input switches 109 and 130 may be readily carried on the body 105 which also carries the microcontroller 102 and the nonvolatile memory 104. Thus, a small single package or single card embodiment of the body 105 may readily carry all the components of the complete emulation device 100 including the connector 120, microcontroller 102, mode switch 109, configurable address switch 130 and the nonvolatile memory 104.

In the illustrated embodiment, the bus emulation device 100 emulates a device connected to an SMBus which is a serial, two wire bus which carries clock, and data signals, including query signals and response signals. The SMBus standard is explained in greater detail in the publication "System Management Bus (SMBus) Specification, Version 2.0" published Aug. 3, 2000. It is appreciated that a bus emulation device in accordance with the present description may emulate other types of busses including $I^2C$, Peripheral Component Interconnect (PCI), Peripheral Component Interconnect Express (PCIe) and Advanced Graphics Port (AGP) busses. The $I^2C$ (Integrated Circuit Inter) bus standard is explained in greater detail in the publication "The $I^2C$-Bus Specification, Version 2.1," published January, 2000.

The bus connector 120 of the illustrated embodiment is compatible with the SMBus and $I^2C$ bus protocols and is adapted to connect to a two wire bus. The emulation device 100 may also have a power input pin and a ground pin. Hence, the emulation device 100 may have as few as exactly four connection pins or terminals, such as first and second input/output terminals of the connector 120, a power input connection terminal and a ground terminal. It is appreciated that the connector 120 may be compatible with other types of busses and the emulation device 100 may have greater or few connection terminals.

Figure 3:
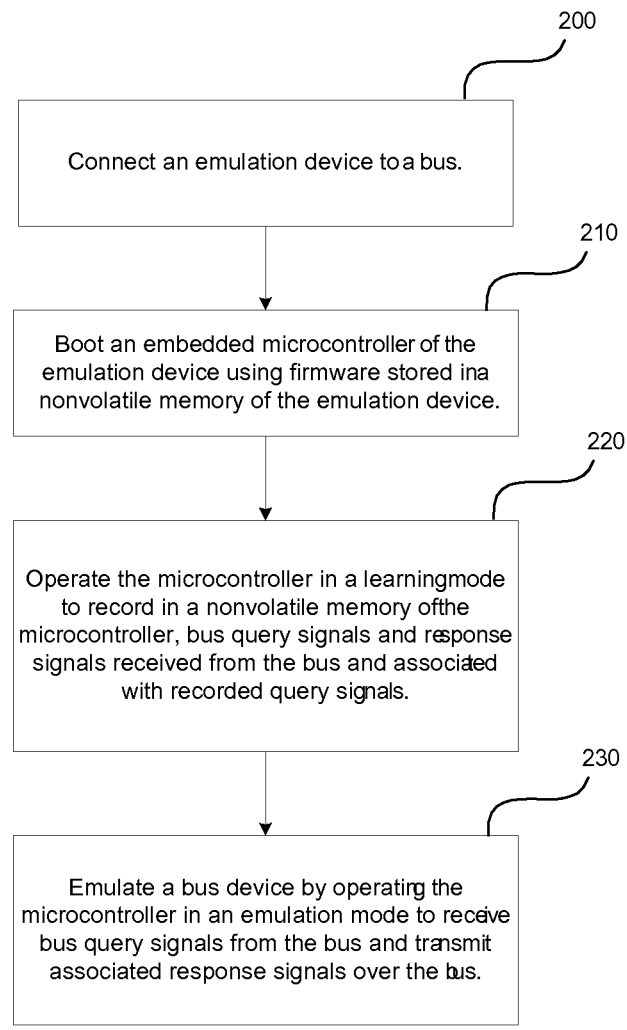
FIG. 3 illustrates an example of operations using the embedded bus emulation device of FIG. 2, in accordance with one embodiment of the present description.
Figure 4:
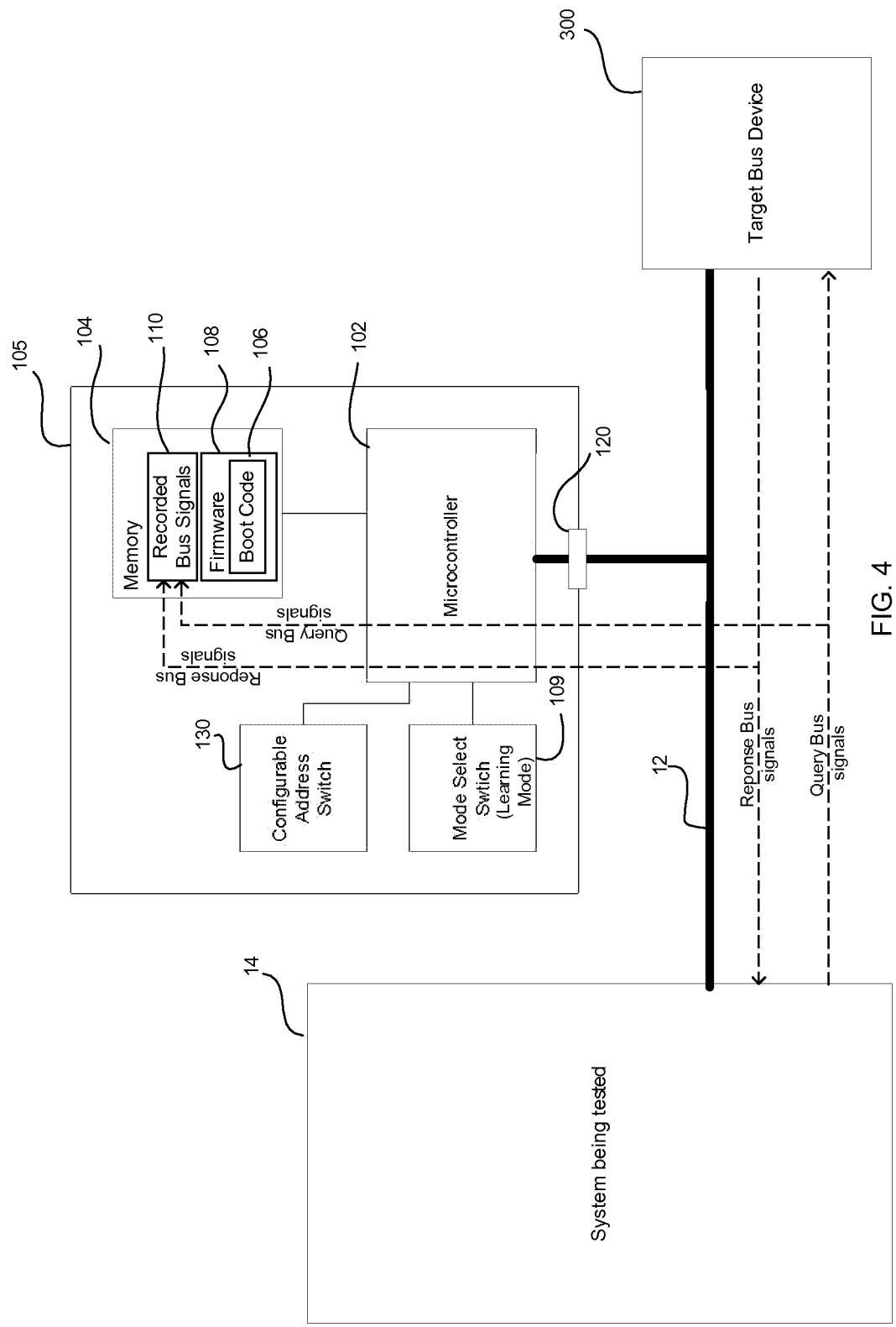
FIG. 4 is a schematic diagram illustrating use of the embedded bus emulation device of FIG. 2 in a learning mode, in accordance with one embodiment of the present description.

FIG. 3 is a flowchart depicting one example of operations of an emulation device in accordance with the present description including operating the device in a learning mode and in an emulation mode. In one operation, an emulation device such as the device 100 is connected (block 200) to a bus, such as the SMBus 12 as shown in FIG. 4. In this embodiment, the emulation device 100 is connected to the bus 12 by the bus connector 120 of the emulation device 100.

In another operation, the embedded microcontroller of the emulation device is booted (block 210) using firmware stored in a nonvolatile memory of the emulation device, wherein the microcontroller is booted to operate in one of a plurality of dedicated modes. In this embodiment, the plurality of dedicated operating modes includes a learning mode and an emulation mode. It is appreciated that the emulation device 100 may be further simplified by limiting the modes of operation to a maximum of two dedication modes, namely, a learning mode and an emulation mode once the boot operation is complete and the emulation device is ready to be operated.

Once booted, the embedded microcontroller may be operated (block 220) in the learning mode and controlled by the firmware to record in a nonvolatile memory of the microcontroller, bus query signals received from the bus and to record in a nonvolatile memory of the microcontroller, response signals received from the bus and associated with recorded query signals. In the illustrated embodiment, the embedded microcontroller polls the mode switch 109 and if the mode switch 109 is set to the "learning mode", the embedded microcontroller switches its mode of operation to the learning mode under the control of the firmware 108.

In the learning mode, the bus device to be emulated may be connected to the bus 12 of a system such as the system 14, as shown, for example, by a bus device designated the "target bus device" 300 in FIG. 4. The system 14 may comprise a desktop, workstation, server, mainframe, laptop, handheld computer, cellular telephone, television or any other device which may utilize a bus such as a bus 12.

In this embodiment, the target bus device 300 may have a particular bus address, and if so, that address may be assigned to the bus emulation device 100 also by configuring the bus address switch 130 of the emulation device 100. In this manner, the target bus device 300 to be emulated and the emulation device 100 for emulating the device 300 can temporarily have the same bus address in the learning mode.

The system 14 may be programmed to command a master bus device or similar device of the system 14 to issue over the bus 12 a query or other bus data signal addressed to the target bus device 300 or broadcast to the bus device 300. Because the emulation device 100 has the same bus address as the target device 300, the embedded microcontroller 102 inspects and recognizes the query signal issued by the system 14 as being intended for the emulation device 100 and stores the query signal in data form in a portion 110 of the nonvolatile memory 104. The query signal may be stored in a table, for example, as shown by the query signal designated "query1" in the Table below.

TABLE

| Query Bus Signal | Response Bus Signal |
|---|---|
| Query1 | Response1 |
| Query2 | Response2 |
| Query3 | Response3 |
| ... | ... |
| QueryN | ResponseN |

Because the target device 300 has the same bus address as the emulation device 100, the target device 300 also inspects and recognizes the query signal "query1" issued by the system 14 as being intended for the target device 300. In response to the query signal "query1" issued by the system 14, the target device 300 issues an appropriate response signal over the bus 12. The embedded microcontroller 102 inspects and recognizes the response signal issued by the target device 300 as being associated with the prior query signal "query1." Hence, the embedded microcontroller stores the received response signal in data form in a portion 110 of the nonvolatile memory 104. The response signal may be stored in a table, for example, as shown by the response signal designated "response1" in the Table above which shows the response signal "response1" being associated with the query signal "query1."

The above process may be repeated to teach the emulation device 100 additional bus signals. Thus, the system 14 can issue additional query signals, query2, query3 . . . queryN addressed to the target device 300 and the query signals may be recorded in the nonvolatile memory of the emulation device 100 as shown by the Table above. In response to each query signal addressed or broadcast to the target device 300, the target device 300 to be emulated can issue appropriate response signals, response2, response3 . . . responseN and those response signals may be recorded in the nonvolatile memory of the emulation device 100 and associated with the query signal which caused the particular response signal to be issued as shown by the Table above.

Examples of response and query signals in the SMBus protocol include protocols such as "Quick Command", "Send Byte," "Receive Byte," "Write Byte/Word," "Read Byte/Word," "Process Call," "Block Write/Read," "Block Write-Block Read Process Call," and "SMBus Host Notify Protocol." Data which might be sent or received in such protocols by an SMBus compatible device might include for example, information such as manufacturer information, model number, part number, and control parameters, and might include instructions such as save state for a suspend event, and report status. It is appreciated that other types of command and data signals may be received, recorded and transmitted by the emulation device 100.

Figure 5:
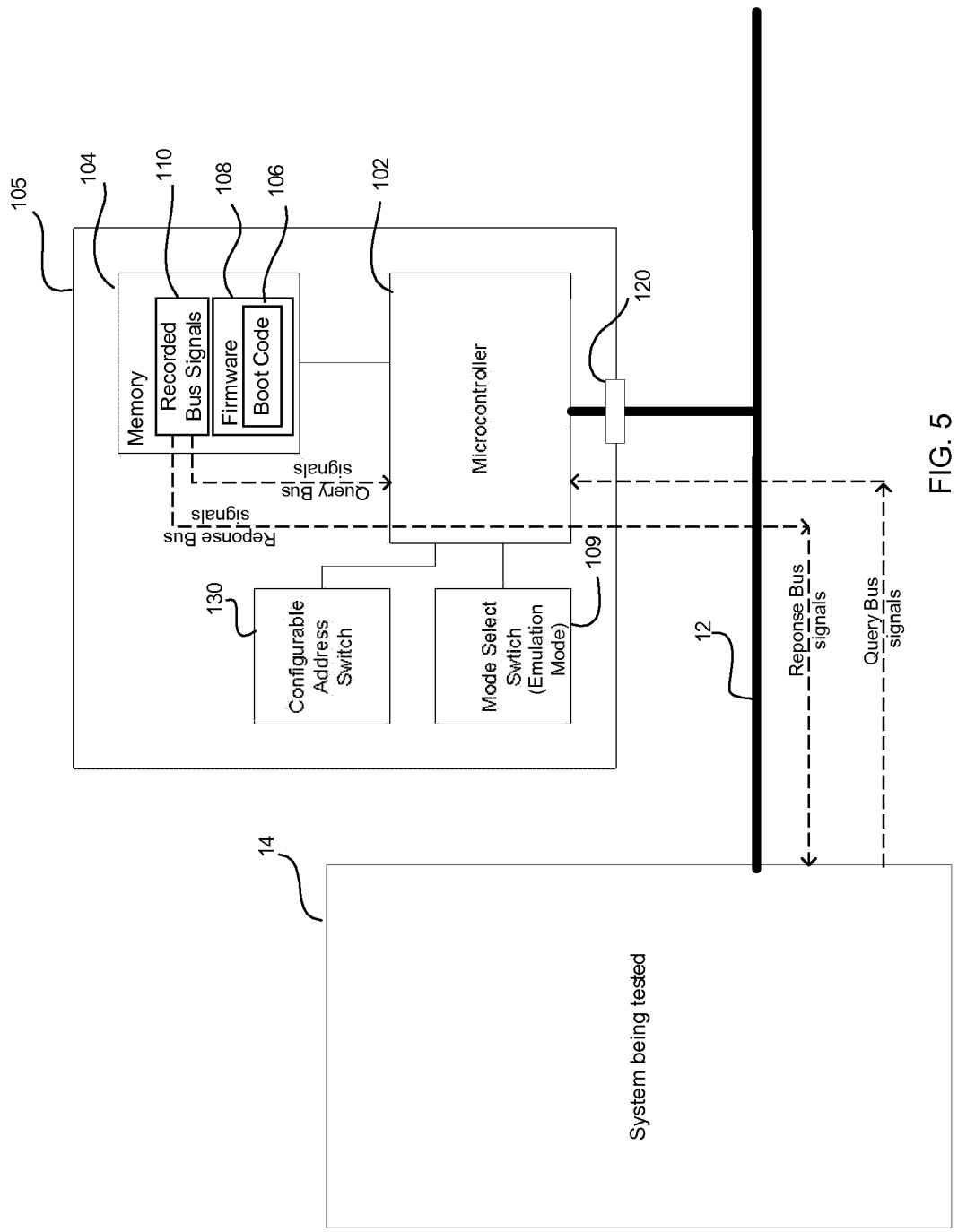
FIG. 5 is a schematic diagram illustrating use of the embedded bus emulation device of FIG. 2 in an emulation mode, in accordance with one embodiment of the present description.

Having taught the emulation device 100 an appropriate number of bus signals exchanged between the system 14 and the target bus device 300, the emulation device 100 may be used to emulate the target bus device 300. In the illustrated embodiment, the mode switch 109 of the emulation device 100 may be switched to the "emulation mode" as shown in FIG. 5 to emulate (block 230) a bus device. In the emulation mode, the embedded microcontroller is controlled by the firmware in the nonvolatile memory to receive bus query signals from a bus and transmit associated response signals over the bus.

As previously mentioned, an emulation device such as the device 100 may be connected (block 200) to a bus, such as the SMBus 12 as shown in FIG. 4 or FIG. 5. The SMBus 12 and system 14 may be the same as that used in the learning mode or may be a different system 14 and bus 12 to be tested using the emulation device 100 in the emulation mode. Because an emulation device 100 in accordance with the present description can be manufactured to be relatively small and lightweight, it may be readily transported and connected to a system such as the system 14 to be tested. In this embodiment, the emulation device 100 is connected to the bus 12 of the system 14 to be tested in FIG. 5 by the bus connector 120 of the emulation device 100.

Once connected to the bus 12 of the system 14 to be tested, the embedded microcontroller of the emulation device is booted (block 210) using firmware stored in a nonvolatile memory of the emulation device, wherein the microcontroller is booted to operate in one of a plurality of dedicated modes as set forth above.

Once booted, the embedded microcontroller may be operated (block 230) in the emulation mode and controlled by the firmware in the nonvolatile memory to receive bus query signals from the bus 12 and transmit associated response signals over the bus 12. In the illustrated embodiment, the embedded microcontroller polls the mode switch 109 and if the mode switch 109 is set to the "emulation mode", the embedded microcontroller switches its mode of operation to the emulation mode under the control of the firmware 108.

As previously mentioned, the target bus device 300 to be emulated typically may have a particular bus address which may be assigned to the bus emulation device 100 also by configuring the bus address switch 130 of the emulation device 100. In this manner, the target bus device 300 to be emulated and the emulation device 100 for emulating the device 300 can temporarily have the same bus address in the emulation mode of the emulation device 100. However, the target device 300 being emulated need not be coupled to the same bus 12 as the emulation device 100 being operated in the emulation mode as shown in FIG. 5.

The system 14 to be tested may be programmed to command a master bus device or similar device of the system 14 to issue over the bus 12 a query or other bus signal addressed or broadcast to the emulation device 100. The embedded microcontroller 102 inspects and recognizes the query signal issued by the system 14 as being intended for the emulation device 100 if the query signal is addressed to the emulation device or is a broadcast signal. Thus, the embedded microcontroller may recognize the received query signal as, for example, the query signal "query1" previously stored in data form in a portion 110 of the nonvolatile memory 104. If so, the embedded microcontroller can determine from the Table above that the proper response signal associated with the query signal query1 is the response signal "response1." Accordingly, the embedded microcontroller 102 can transmit the response signal response 1 over the bus 12 back to the system 12 which issued the query signal.

The above process may be repeated so that the emulation device 100 can emulate additional bus signals. Thus, the system 14 can issue additional query signals, query2, query3 . . . queryN addressed to the emulation device 100. In response to each query signal addressed to the emulation device 100, the emulation device 100 can inspect the table stored in the nonvolatile memory and issue appropriate response signals, response2, response3 . . . responseN over the bus 12 to the system 14.

The foregoing description of various embodiments has been presented for the purposes of illustration and description. It is not intended to be exhaustive or to limit to the precise form disclosed. Many modifications and variations are possible in light of the above teaching.

What is claimed is:

1. A bus emulation device for use with a bus, comprising:
   a connector coupled to said bus and adapted to receive and transmit bus signals between said device and said bus, said bus signals including bus query and bus response signals;
   an embedded microcontroller;
   a mode switch; and
   a nonvolatile memory including firmware stored therein, said firmware including boot code adapted to boot said microcontroller to operate in one of a plurality of dedicated modes in response to said mode switch, said dedicated modes including a learning mode and an emulation mode, wherein in said learning mode, said microcontroller is controlled by said firmware to record in said nonvolatile memory bus query signals received from said bus and to record in said nonvolatile memory, response signals received from said bus and associated with recorded query signals; and wherein in said emulation mode, said microcontroller is controlled by said firmware to transmit recorded response signals in response to receipt of associated query signals.

2. The emulation device of claim 1 wherein said firmware limits said microcontroller to be booted to operate in only one of two dedicated modes, said learning mode and said emulation mode.

3. The emulation device of claim 1 further comprising an address switch carried by said emulation device and configurable to define a bus address of said emulation device.

4. The emulation device of claim 1 for use with a target bus device coupled to said bus and having a bus address, said emulation further comprising an address switch carried by said device and configurable to define a bus address of said emulation device to be the same as said target bus device, wherein said operating said microcontroller in said learning mode includes recording in said nonvolatile memory of said microcontroller, response signals generated by said target bus device in response to recorded query signals.

5. The emulation device of claim 1 further comprising a single package carrying said connector, microcontroller, mode switch and nonvolatile memory.

6. The emulation device of claim 1 further comprising a single card carrying said connector, microcontroller, mode switch and nonvolatile memory.

7. The emulation device of claim 1 wherein said emulation device has exactly four connections terminals which are first and second input/output terminals of said connector, a power input connection terminals and a ground terminal.

8. The emulation device of claim 1 wherein said bus is a System Management Bus.

9. A method, comprising:
   connecting an emulation device to a bus;
   booting an embedded microcontroller of said emulation device using firmware stored in a nonvolatile memory of said emulation device, wherein said microcontroller is booted to operate in one of a plurality of dedicated modes including a learning mode and an emulation mode;
   operating said microcontroller in said learning mode controlled by said firmware to record in a nonvolatile memory of said microcontroller, bus query signals received from said bus and to record in a nonvolatile memory of said microcontroller, response signals received from said bus and associated with recorded query signals; and
   emulating a bus device, said emulating including operating said microcontroller in said emulation mode controlled by said firmware to receive bus query signals from said bus and transmit associated response signals over said bus.

10. The method of claim 9 further comprising switching said microcontroller to said dedicated learning mode using a mode switch carried by said emulation device.

11. The method of claim 9 further comprising switching said microcontroller to said dedicated emulation mode using a mode switch carried by said emulation device.

12. The method of claim 9 wherein said microcontroller is booted to operate in only one of two dedicated modes, said learning mode and said emulation mode.

13. The method of claim 9 further comprising configuring an address switch carried by said device to define a bus address of said device.

14. The method of claim 9 further comprising coupling a target bus device having a bus address, to said bus, configuring an address switch carried by said emulation device to define a bus address of said emulation device to be the same as said target bus device, wherein said operating said microcontroller in said learning mode includes recording in a nonvolatile memory of said microcontroller, response signals generated by said target bus device in response to recorded query signals.

15. The method of claim 9 wherein said bus is a System Management Bus.

* * * * *